UNITED STATES PATENT OFFICE.

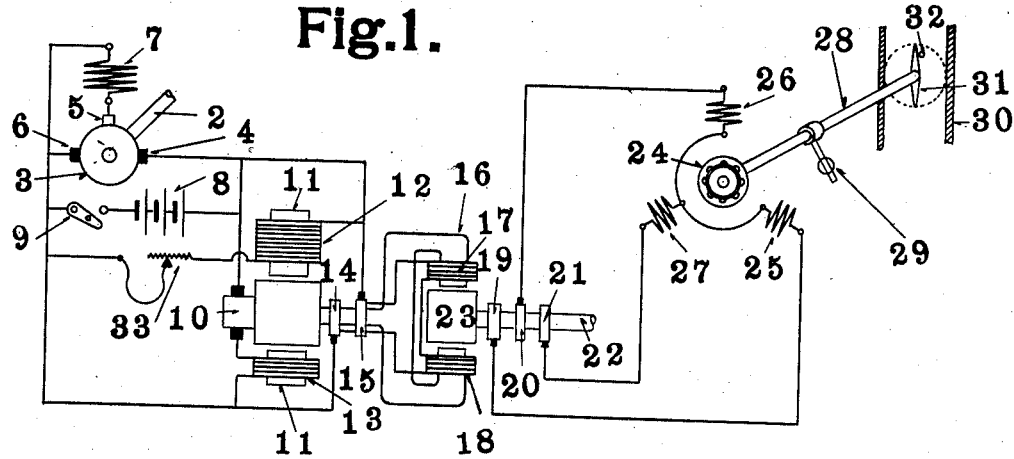

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

SPEED-REGULATING APPARATUS.

1,345,539.  Specification of Letters Patent.  Patented July 6, 1920.

Application filed April 25, 1918. Serial No. 230,754.

*To all whom it may concern:*

Be it known that I, VALÈRE A. FYNN, a subject of the King of England, residing at the city of St. Louis, State of Missouri, United States of America, have invented a certain new and useful Speed-Regulating Apparatus, of which the following is such a full, clear, and exact description as will enable any one skilled in the art to which it appertains to make and use the same, reference being had to the accompanying drawings, forming part of this specification.

My invention relates to means for controlling the speed of prime movers and particularly to such means as will keep the engine as near to a predetermined speed as possible, irrespective of load and will allow of a wide range of speed adjustment.

In carrying my invention into practice, I provide an electromagnetic device for mechanically controlling the throttle valve, or equivalent, of the prime mover and electrically connect same to an armature driven by the engine and coöperating with a controlling magnetic field driven at a constant or nearly constant speed. When the magnetic field and the coöperating armature revolve in the same direction and at the same speed, no E. M. F.'s are induced in the armature and no effort is exerted on the throttle valve by the electromagnetic device attached to it. Any speed difference between the field and the armature, however, at once results in an E. M. F. in the latter, a current in the electromagnetic device and a torque on the throttle. This torque will be in one direction when the engine speed exceeds that of the revolving magnetic field and in the opposite direction when the field revolves faster than the engine driven armature. I can arrange to hold the throttle normally open by means of a weight or spring and to close it when the speed of the engine driven armature exceeds that of the revolving field and I prefer to make the electromagnetic device, which I place in control of the throttle, in the form of either a direct or alternating current motor or relay. In case an alternating current motor is used, the engine driven armature 23 must have slip rings. In order to derive direct current from this armature it would be necessary to provide it with a commutated winding and to have the brushes coöperating with its commutator mounted on the rotating field to revolve with same. A simple way of revolving the controlling field is to produce same by means of a unidirectional excitation and to rotate the structure in which it is produced by means of a constant speed motor of any desired kind. Another way is to produce this controlling field by means of polyphase currents derived, for instance, from a constant speed direct current to alternating current converter.

Referring to the accompanying diagrammatic drawings, Figure 1 shows one embodiment of my invention, for instance, as applied to an internal combustion engine, and Fig. 2 illustrates another embodiment thereof.

Referring to Fig. 1, the throttle valve 31 located in the pipe 30 is mounted on the shaft 28 and held against the stop 32 by the weight 29. Mounted on this shaft 28 is the squirrel cage rotor 24 coöperating with a stator provided with the star connected three-phase winding 25, 26, 27 connected to the slip rings 19, 20, 21 of the generator armature 23 mounted on the shaft 22 driven by the prime mover. The armature 23 coöperates with the field structure 16 provided with the unidirectional exciting winding 17, 18 connected to the slip rings 14, 15 and driven by an electric motor with the armature 10 and the field structure 11. This motor is provided with a shunt winding 12 and a series winding 13. On the shaft 2 driven by the engine is the armature 3 of a generator having the exciting winding 7, the main brushes 4, 6 and the auxiliary brush 5. The exciting winding is connected between the brushes 5 and 6. The motor exciting winding 12 is connected to the main brushes 4, 6 through the adjustable resistance 33 and the motor armature 10 is connected to said brushes in series with the exciting winding 13. A storage battery 8 is adapted to be connected across the main brushes 4, 6 of the generator.

In Fig. 2 the arrangement and connections of the direct current generator driven from the engine, the storage battery and the direct current motor are exactly the same as in Fig. 1. The throttle valve controlling mechanism, including the motor relay 24, is also exactly the same but the armature 23 of the regulating generator coöperates with a stationary field structure provided with the three-phase star connected winding 37, 38, 39 connected to the slip rings 34, 35, 36 connected to a winding on the motor armature 10 to derive three-phase currents therefrom.

The operation of the embodiment shown in Fig. 1 is somewhat as follows: With the engine in operation the switch 9 will be closed. The direct current generator 3 is preferably so designed that at the lowest speed at which the engine is to be regulated it will either float on the battery 8 or send a small charging current into it. This generator is of the Sayers type and will properly coöperate with the battery at any engine speed above the lowest for which it is designed and in a manner now well understood, with the result that the terminal voltage of the combination will be practically constant for any engine speed, changing a little occasionally with the state of charge of the battery. Under these circumstances, the direct current motor 10 will be fed at a practically constant voltage irrespective of the engine speed and will therefore run at a practically constant speed unless otherwise designed or adjusted. To make the speed of this motor independent of any variations of the voltage impressed on it, I prefer to keep the magnetic densities low throughout the machine. The series winding 13 is for the purpose of permitting of an adjustment of the motor speed in response to variations of the motor load. This winding can be connected and dimensioned to make the motor speed practically independent of the load or to change it in a desired manner as the load changes. The motor speed can, for instance, be made to diminish to any desired extent as the motor load increases. The speed of the engine is determined by the speed of this pilot motor and can be set to any desired value within the operating range by means of the adjustable resistance 33 in the shunt of the pilot motor.

For a given pilot motor speed the torque exerted by the relay armature 24 will depend on the engine speed. When the engine driven armature 23 runs at the same speed as the field structure 16 and therefore at the same speed as the pilot motor, then no E. M. F. is generated in said armature and no current is sent into the stator of the relay. Should the load on the engine be now reduced, then its speed will increase, and a current sent into the relay stator. At a certain load the relay torque will just balance the weight 29 and any further reduction of the engine load and consequent speed increase will result in a movement of the throttle in the direction of its closed position. At no-load this valve will have to be nearly closed and this will require a maximum speed difference between the revolving field and the engine driven armature.

If the speed of the pilot motor remains strictly constant, irrespective of the load on same, which of course, increases as the speed difference between 16 and 23 increases, then the no-load speed of the engine will be higher than its full-load speed, the difference depending on the magnitude of the maximum torque required by the relay and the size of the regulating generator. The smaller the relay torque and the larger the generator 16, 23, the smaller the difference between the no-load and the full-load speeds of the engine. But if the speed of the pilot motor diminishes with increasing motor load, as is natural, then this motor will run slower with nearly closed throttle at which time the load on it is greatest because the speed difference between 16 and 23 is a maximum. If the maximum speed difference required between 16 and 23 with no engine load is 100 revolutions, while the full-load speed difference is 20 revolutions; then for a constant pilot motor speed of 1000 revolutions, the engine no-load speed will be 1100 and its full-load speed will be 1020. If the pilot motor speed with the minimum motor load, which corresponds to full-load of the engine, is 980 and its speed with full-load, corresponding to no-load on the engine, is 900, then the engine speed will be the same at no-load and at full-load. By causing the pilot motor to suitably change its speed it is possible to cause the engine to run faster at full-load than at no-load as is very desirable for instance when the engine drives an electric generator. The output current of such a generator can readily be used to modify the engine speed conditions to suit the generator by modifying the pilot motor excitation in dependence upon said output current.

The operation of the embodiment shown in Fig. 2 is the same except that the speed controlling revolving field is here produced in the stationary field structure of the generator 23 by means of polyphase currents derived from the motor or direct current to alternating current rotary converter 10. The speed of the controlling field produced by the three phase windings is always proportional to the speed of the converter armature 10 and the engine speed can therefore be influenced by changing or adjusting the speed of this armature. This can be done independently of the load on the converter by means of the adjustable resistance 33 in the circuit of the shunt winding 12 and in dependence on the load by means of the series winding 13. The impedance of the alternating current converter load also has an influence on the speed of the armature 10 and therefore on the speed of the controlling field coöperating with the armature 23.

The greater the lag in this circuit, the higher the speed of the armature 10. When the engine is fully loaded and the converter load is therefore small, then the power factor of the generator 23 is low because the magnetizing currents preponderate. Without load on the engine and a maximum load on the converter, the power factor is higher because of the load currents. The converter will therefore tend to run faster with full load on the engine and will thus reduce the difference between the engine speed at no-load and the engine speed at full-load. This difference can as in Fig. 1 be adjusted in any desired direction and to any desired degree by suitably proportioning or regulating the series winding 13 of the converter or broadly by suitably regulating the converter excitation in Fig. 2 and the motor excitation in Fig. 1.

It will be understood that in the case of prime movers, such as internal combustion engines, the battery 8 can readily be used to start or crank the engine by means of a suitable cranking motor before being connected to the direct current generator as shown.

Having fully described my invention, what I claim as new and desire to secure by Letters Patent of the United States is:

1. In speed regulating apparatus, the combination with a device to be regulated, of electromagnetic speed controlling means therefor, a device operating at a speed independent of that of the device to be regulated, and means for supplying to the electromagnetic speed controlling means an E. M. F. the magnitude of which is dependent on the difference in the speed of said devices.

2. In speed regulating apparatus for prime movers, the combination with means controlling the power supply to the prime mover, of electromagnetic means for actuating the controlling means, a device operating at a speed independent of the speed of the prime mover, and means for supplying to the electromagnetic actuating means an E. M. F. the magnitude of which is dependent on the difference between the speed of said device and the prime mover.

3. In speed regulating apparatus for prime movers, the combination with means controlling the power supply to the prime mover, of a polyphase relay for actuating the controlling means, a device operating at a speed independent of the speed of the prime mover, and means for supplying to the polyphase relay an E. M. F. the magnitude of which is dependent on the difference between the speed of said device and the prime mover.

4. In speed regulating apparatus for prime movers, the combination with means controlling the power supply to the prime mover, of electromagnetic means for actuating the controlling means, an armature driven by the prime mover, and in circuit with the electromagnetic actuating means, and means for subjecting said armature to a magnetic field revolving at a speed independent of the speed of the prime mover.

5. In speed regulating apparatus for prime movers, the combination with means controlling the power supply to the prime mover, of electromagnetic means for actuating the controlling means, an armature driven by the prime mover, and in circuit with the electromagnetic actuating means, and means for subjecting said armature to a magnetic field revolving in the same direction as the armature and at a speed independent of the speed of the prime mover.

6. In speed regulating apparatus for internal combustion engines, the combination of a valve controlling the fuel supply to the engine, a polyphase relay for actuating said valve, and means for supplying to said relay a polyphase E. M. F. the magnitude of which is dependent upon variation of engine speed from a predetermined rate.

7. In speed regulating apparatus for prime movers, the combination with means controlling the power supply to the prime mover, of electromagnetic means for actuating the controlling means, a dynamo electric machine having both members movable, one of said members being driven by the prime mover, means for driving the other member at a speed independent of the speed of the prime mover and means connecting one of the members of said dynamo electric machine in circuit with the electromagnetic actuating means.

8. In speed regulating apparatus for prime movers, the combination with means controlling the power supply to the prime mover, of electromagnetic means for actuating the controlling means, a generator driven by the prime mover, a motor in circuit with the generator, a dynamo electric machine having both members movable, one of said members being driven by the prime mover and the other driven by the motor, and means connecting said dynamo electric machine in circuit with the electromagnetic actuating means.

9. In speed regulating apparatus for prime movers, the combination with means controlling the power supply to the prime mover, of electromagnetic means for actuating the controlling means, a generator driven by the prime mover, a motor in circuit with the generator, a dynamo electric machine having both members movable, one of said members being driven by the prime mover and the other driven by the motor, both of said members being driven in the same direction and means connecting said dynamo electric machine in circuit with the electromagnetic actuating means.

10. In speed regulating apparatus for internal combustion engines, the combination of a valve controlling the fuel supply to the engine, means tending to hold said valve in open position, a polyphase relay for actuating said valve and means for supplying to said relay a polyphase E. M. F. the magnitude of which is dependent upon variation of engine speed from a predetermined rate.

11. In speed regulating apparatus for prime movers, the combination with means controlling the power supply to the prime mover, of a polyphase relay for actuating the controlling means, an armature driven by the prime mover, and in circuit with the polyphase relay, and means for subjecting said armature to a magnetic field revolving at a speed independent of the speed of the prime mover.

12. In speed regulating apparatus for prime movers, the combination with means controlling the power supply to the prime mover, a polyphase relay for actuating the controlling means, a generator driven by the prime mover, a motor in circuit with the generator, means for varying excitation of the motor, a dynamo electric machine having both members movable, one of said members being driven by the prime mover and the other driven by the motor, and means connecting said dynamo electric machine in circuit with the polyphase relay.

In testimony whereof, I have hereunto set my hand and affixed my seal.

VALÈRE A. FYNN. [L. S.]